United States Patent [19]
Mott

[11] 3,898,163
[45] Aug. 5, 1975

[54] TUBE SEAL JOINT AND METHOD THEREFOR

[76] Inventor: Lambert H. Mott, c/o Mott Metallurgical Corporation, P.O. Drawer "L", Farmington Industrial Park, Farmington, Conn. 06032

[22] Filed: Feb. 11, 1974

[21] Appl. No.: 441,127

[52] U.S. Cl. ................ 210/246; 29/520; 29/522; 210/478; 277/205; 285/340; 285/348; 285/354
[51] Int. Cl.² ............. B01D 23/00; B01D 35/00; B21D 39/00; B23P 11/00
[58] Field of Search ...... 29/520, 522; 285/340, 348, 285/354; 210/457, 510, 478, 246; 277/205, 236

[56] References Cited
UNITED STATES PATENTS

| | | | |
|---|---|---|---|
| 1,516,397 | 11/1924 | Mueller et al. | 285/340 |
| 2,186,974 | 1/1940 | Ice | 285/340 |
| 3,033,783 | 5/1962 | Lubben | 210/510 |
| 3,042,079 | 7/1962 | Swift et al. | 210/510 X |
| 3,147,015 | 9/1964 | Hanback | 277/205 |
| 3,724,064 | 4/1973 | Mott | 29/520 |

*Primary Examiner*—Charlie T. Moon
*Attorney, Agent, or Firm*—Peter L. Tailer

[57] ABSTRACT

A tube is sealed in a fitting having a fitting body and a nut by inserting the tube into the fitting body with an annular clearance between the fitting body and the tube, inserting annular seals within the clearance about the tube, the seals each having an annular corrugation and the seals being alternately inverted, placing a single annular spacer above the seals about the tube, and tightening the nut down over the fitting body forcing the spacer down in the clearance flattening the annular corrugations of the seals to expand the seals radially inward and outward to engage and jam between the tube and the fitting body.

2 Claims, 5 Drawing Figures

PATENTED AUG 5 1975

3,898,163

TUBE SEAL JOINT AND METHOD THEREFOR

BACKGROUND OF THE INVENTION

This invention is an improvement on that disclosed in my U.S. Pat. No. 3,724,064 which issued Apr. 3, 1973. When porous metal tubes and fittings therefor are fabricated from certain alloys, the alloys will embrittle during the welding of the tube to the fitting to cause a danger of tube breakage at the weld joint. In the high pressure filtration of synthetic polymers and like applications, conventional compression fittings cannot be relied upon to provide a tight seal at the extreme pressures involved. This invention provides a mechanical high pressure seal for tubes.

SUMMARY OF THE INVENTION

A fitting body for receiving a tube contains a through channel and a counterbore into which the tube is inserted with an annular clearance between the tube and the fitting body. A plurality of alternately inverted annular seals are inserted in the clearance about the tube, each annular seal having an annular corrugation. A spacer is placed about the tube over the seals and a nut is screwed down about the fitting body to force the spacer down in the clearance compressing and flattening the seals to expand them radially inward and outward to tightly engage the fitting and the tube. If desired, the spacer may take the form of a downward extending annular flange integrally formed with the top of the nut.

The tube seal of this invention will provide a tight seal for porous tubes if the sum of the thickness of the seals about a given porous tube is greater than the wall thickness of the porous tube. When this seal is used with filter tubes and the tubes become plugged or corrode, tube fittings may be re-used unlike conventional welded fittings that must be discarded. In addition, this invention provides an excellent and inexpensive fitting for non-porous tubes and it has other sealing applications as in sealing boiler tubes in tube sheet and the like.

DESCRIPTION OF THE PREFERRED EMBODIMENTS

Figure 2:
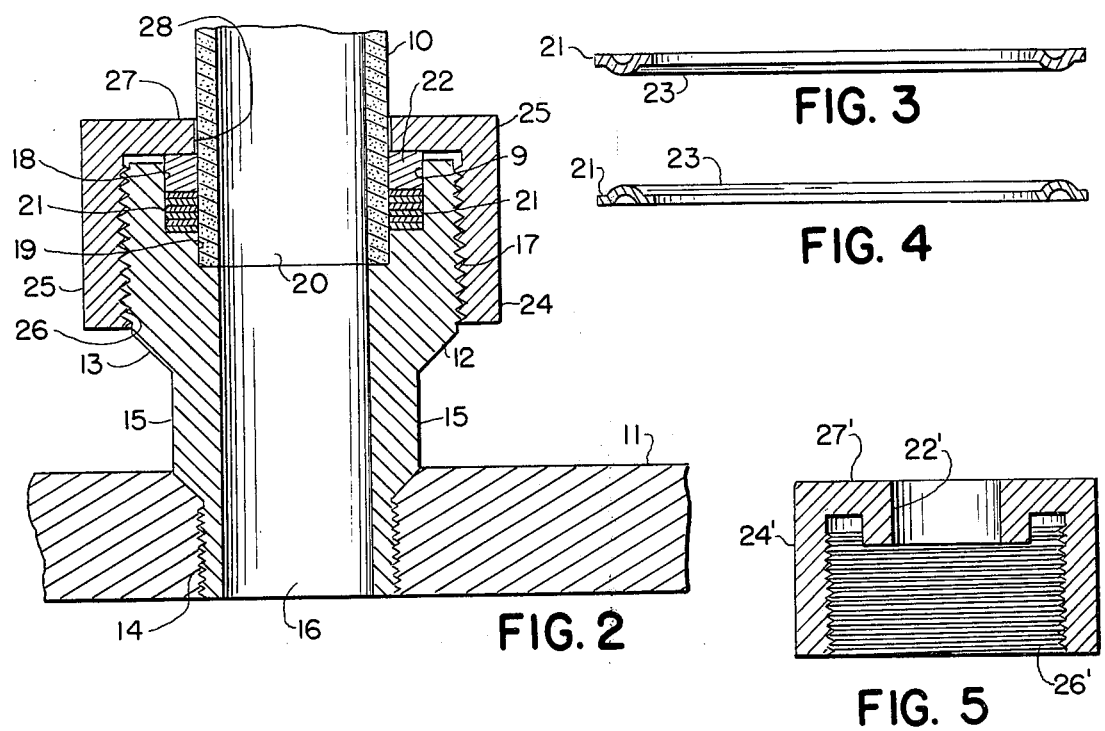
FIG. 2 is a longitudinal, vertical section through a broken away end of a porous tube sealed in a fitting which is turned into a fragment of a tube sheet.
Figure 3:
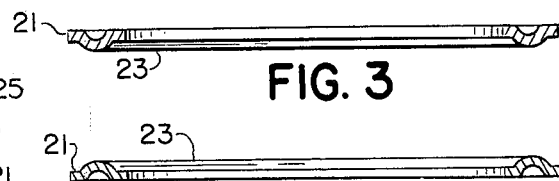
FIGS. 3 and 4 are longitudinal, vertical sections through an inverted and an upright seal, respectively.
Figure 4:

As shown in FIG. 2, a porous filter tube 10 is fixed in tube sheet 11 by means of the fitting 12. Fitting 12 has a fitting body 13 with a lower threaded portion 14 which is turned into the tube sheet 11. Above the lower threaded portion 14, the fitting body is formed with flat sides 15 to turn it into or out of tube sheet 11. Fitting body 13 contains a longitudinal through channel 16, and it has threads 17 formed on its upper end. The upper end of fitting body 13 contains a large counterbore 18 and a smaller counter bore 19 which is deeper than bore 18 and receives the end 20 of tube 10. Large counterbore 18 leaves a clearance 9 between tube 10 and itself.

Figure 1:
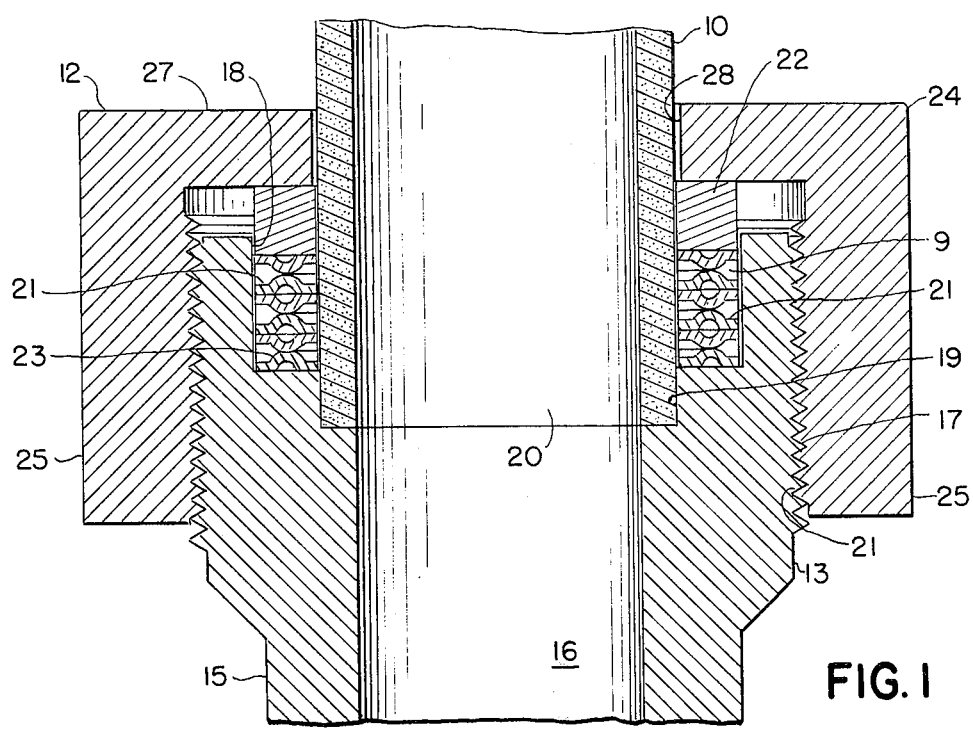
FIG. 1 is a longitudinal, vertical section through a broken away end of a porous tube inserted in a fitting prior to its being sealed therein according to this invention.

As shown in FIG. 1, the clearance 9 has inserted therein the seals 21. Each seal 21 has an annular corrugation 23 and the seals 21 are placed in clearance 9 with alternate seals 21 inverted so that pairs of seals 21 contact each other corrugation to corrugation. An annular spacer 22 is placed above the seals 21, the seals 21 and the spacer 22 fitting with slight clearances or a sliding fit about tube 10 and within counterbore 18.

A nut 24 has flat sides 25, internal threads 26, and a top 27 containing an opening 28 to receive tube 10 therethrough. Nut 24 is turned downward about fitting body 13 so that its top 27 forces spacer 22 down to compress the seals 21 and flatten their annular corrugations 23 to expand the seals 21 radially outward and inward so that they engage and jam between the tube 10 and fitting body 13. When the seals 21 are flattened as shown in FIG. 2, they form a tight seal between fitting body 13 and the outer surface of tube 10.

Since there are a number of seals 21, they have a total area of contact with tube 10 and fitting body 13 that is quite large. The area of contact is important when porous tubes 10 are sealed in a fitting 12 or the like as the sum of the thickness of the seals should be greater than the thickness of the porous tube walls being sealed. If the sum of the thicknesses of the seals 21 is less than the wall thickness of a given porous tube being sealed, flow can leak past the seals 21 within the tube wall. When the sum of the thicknesses of the seals 21 is greater than the wall thickness of a porous tube 10 being sealed, flow will only take place through the tube wall rather than longitudinally within the tube wall past the seals.

While a tube fitting 12 is shown for porous filter tubes 10, the sealing method and the seal of this invention may be used for fixing boiler tubes in a tube sheet and in other applications. The seals 21 may be made from stainless steel and a wide variety of other metals and materials that will deform to flatten the corrugations 23.

This invention provides a considerable advantage over the use of a single thick seal to obtain a desired total seal thickness. For example, when seals 21 are made of a given material, six seals 21 of one-sixth the thickness of a single seal will flatten with much less force than a single seal. This provides greater radial jamming force which results in better sealing action. If the seals 21 were not alternately inverted, greater force would be required to crush the annular corrugations 23 as non-inverted corrugations 23 would nest and reinforce each other to resist flattening.

Figure 5:
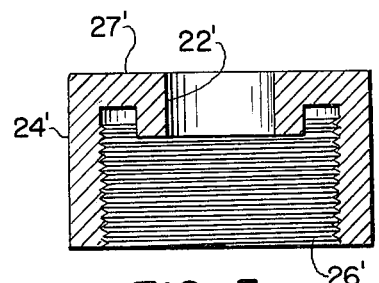
FIG. 5 is a longitudinal, vertical section through a modified nut which may be used with the fitting of FIGS. 1 and 2.

As shown in FIG. 5, the single spacer 22 can be formed as a downward extending annular flange 22' integrally formed with a top 27' of a nut 24' having internal threads 26'.

What is claimed is:

1. A porous metal tube having a porous metal wall of a given thickness and a fitting sealed thereto comprising, in combination, a fitting body containing a through passage having at least an upper portion to receive said porous tube therein, containing a cylindrical cavity counterbored in said upper portion of said through passage, and having a threaded portion, at least two pairs of annular seals disposed about said tube, said annular seals each having an annular corrugation, alternate seals being inverted with pairs of seals contacting each other corrugation to corrugation, said seals being disposed in said cavity fitting with slight clearance about said tube and within said cavity, an annular spacer disposed about said tube within said cavity above said seals, and a nut having threads engaging said threaded portion of said fitting body, said nut extending over said cavity and containing an opening through which said tube passes, said seals having thicknesses the sum of which is greater than the thickness of said wall of said porous tube, said nut turning to force said spacer against said seals flattening said seals and radially expanding said seals inward and outward against said tube and said cavity.

2. The method of sealing a tube having a porous metal wall in a fitting comprising the steps of:

a. inserting the tube in a counterbore in the fitting leaving a clearance about the tube within the counterbore;

b. providing at least two pairs of annular seals with annular corrugations;

c. placing the annular seals about the tube within the clearance with alternate seals inverted so that pairs of seals are disposed corrugation to corrugation and so that the sum of the thicknesses of the seals is greater than the wall thickness of the tube; and d. turning a nut downward about the fitting compressing the seals within the clearance to flatten the annular corrugations of the seals and expand the seals radially inward and outward jamming the seals between the tube and the fitting sealing the tube within the fitting.

* * * * *